Figure 1:
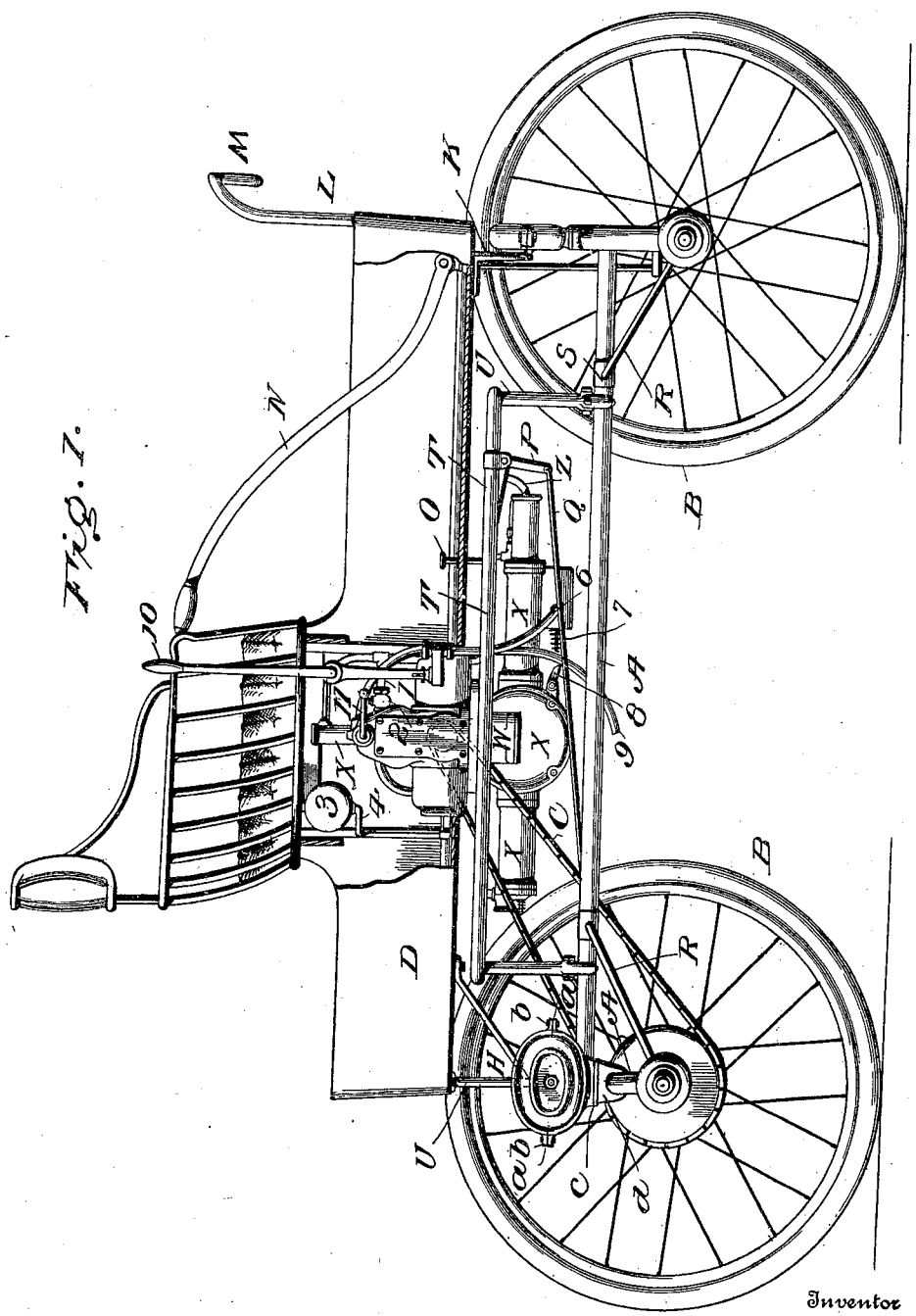

No. 674,372. Patented May 21, 1901.
J. C. ANDERSON.
AUTOMOBILE VEHICLE.
(Application filed Sept. 6, 1900.)
(No Model.) 4 Sheets—Sheet 1.

Witnesses
Jno Innis
W. A. Williams.

Inventor
J. C. Anderson
By Wm C. McIntire Attorney

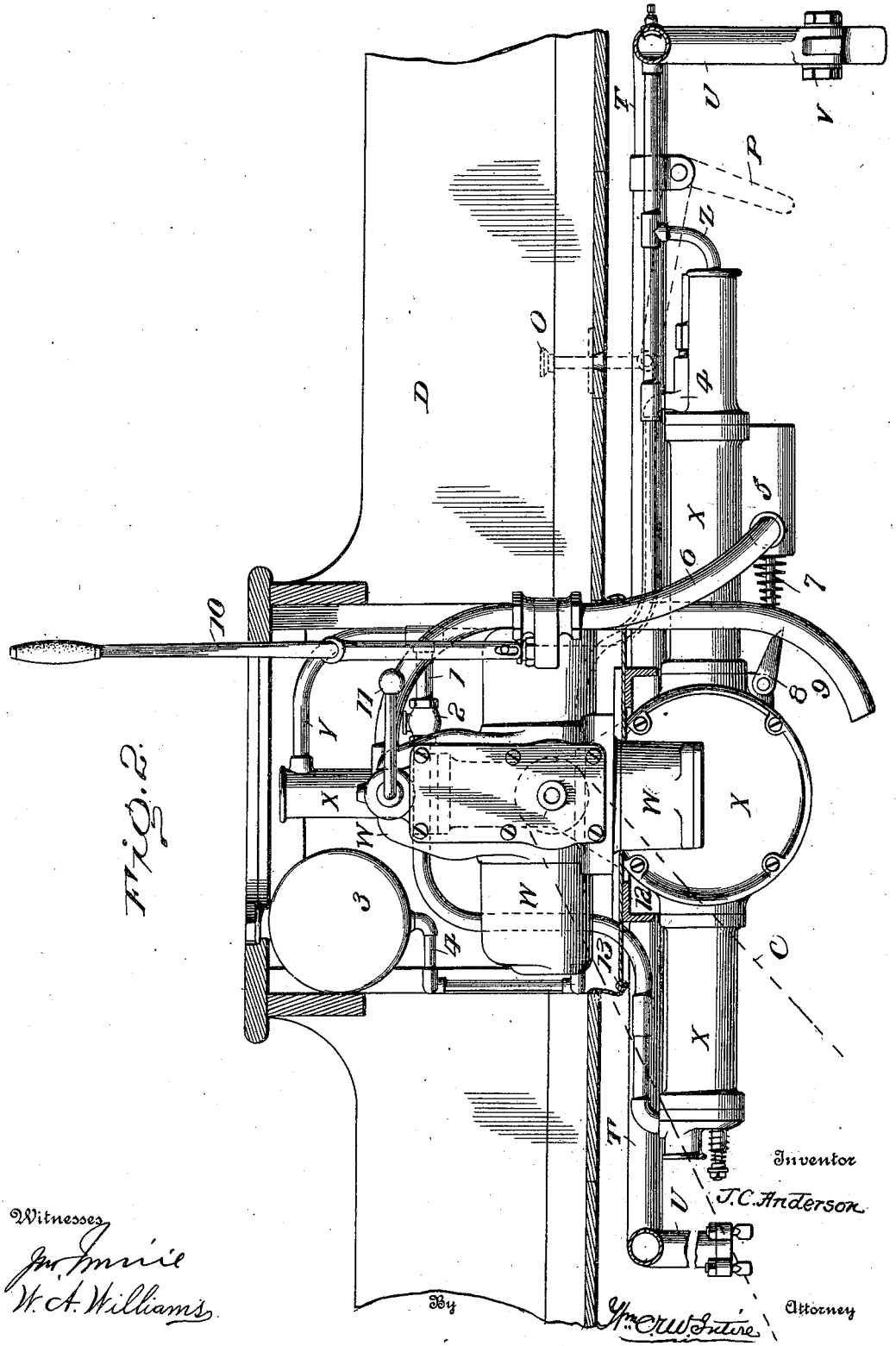

No. 674,372. Patented May 21, 1901.
J. C. ANDERSON.
AUTOMOBILE VEHICLE.
(Application filed Sept. 6, 1900.)
(No Model.) 4 Sheets—Sheet 3.
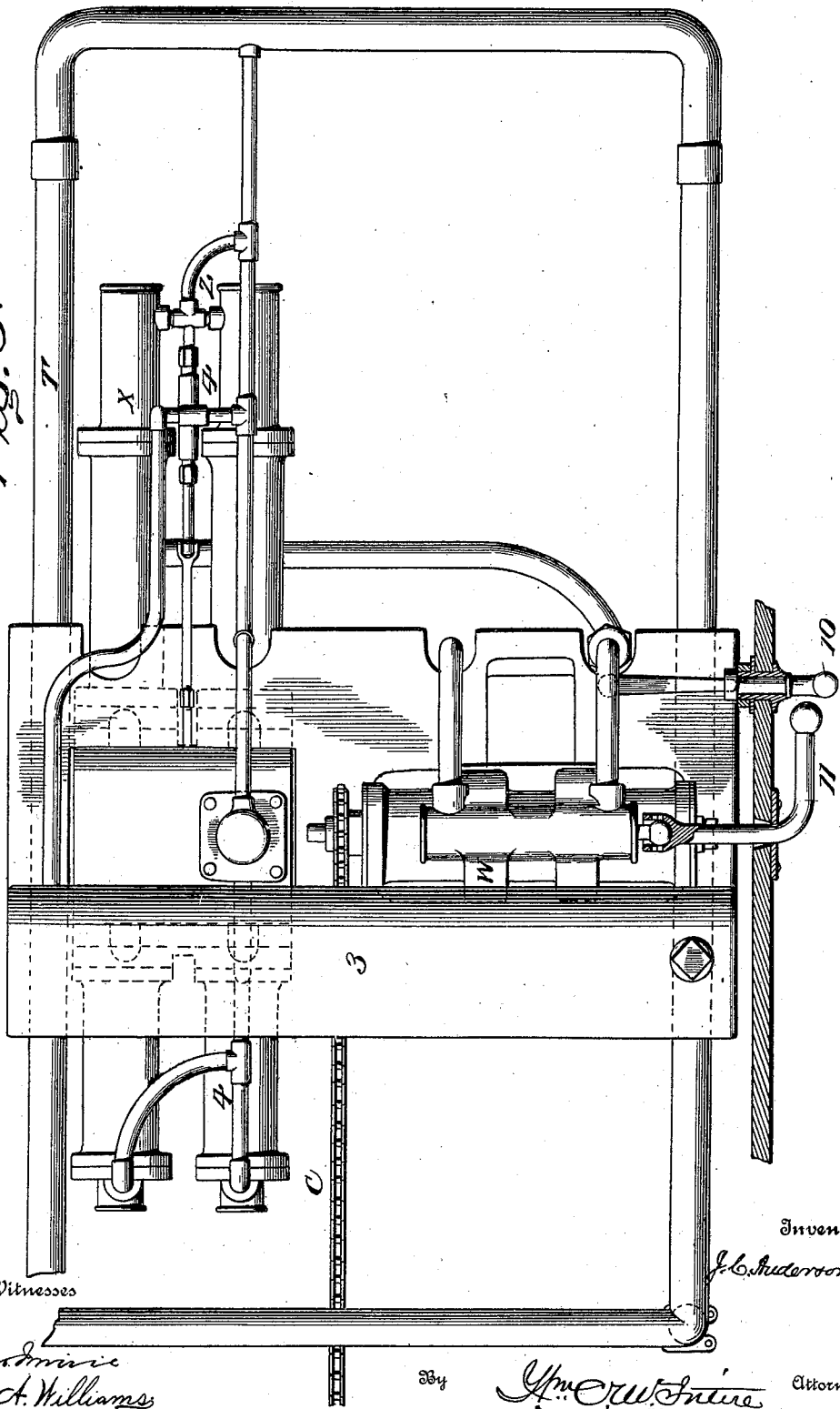

No. 674,372. Patented May 21, 1901.
J. C. ANDERSON.
AUTOMOBILE VEHICLE.
(Application filed Sept. 6, 1900.)
(No Model.) 4 Sheets—Sheet 4.
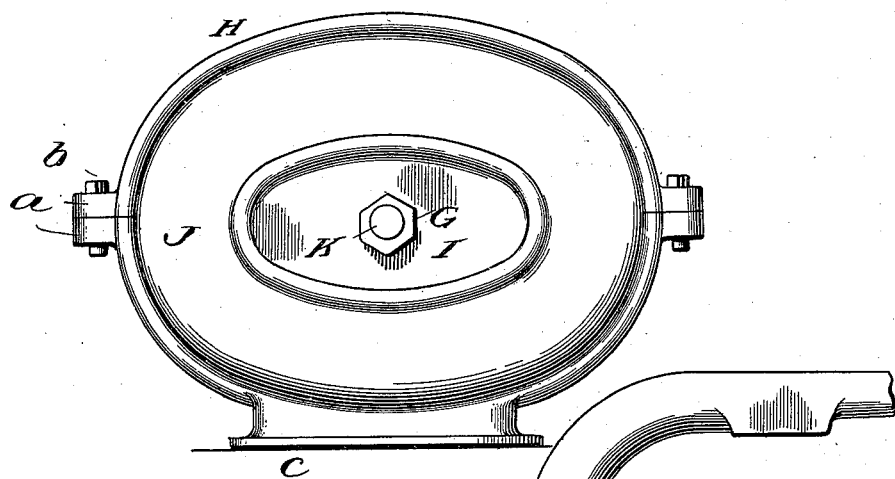
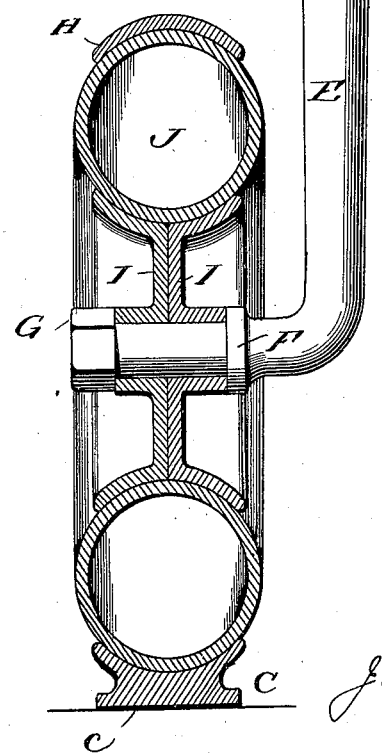
Witnesses
Inventor
J. C. Anderson
Attorney

UNITED STATES PATENT OFFICE.

JAMES C. ANDERSON, OF HIGHLAND PARK, ILLINOIS.

AUTOMOBILE VEHICLE.

SPECIFICATION forming part of Letters Patent No. 674,372, dated May 21, 1901.

Application filed September 6, 1900. Serial No. 29,189. (No model.)

*To all whom it may concern:*

Be it known that I, JAMES C. ANDERSON, a citizen of the United States, residing at Highland Park, in the county of Lake and State of Illinois, have invented certain new and useful Improvements in Automobile Vehicles; and I do hereby declare the following to be a full, clear, and exact description of the invention, such as will enable others skilled in the art to which it appertains to make and use the same.

My invention relates to certain new and useful improvements in automobile vehicles.

In the present state of the art the self-propelled vehicles may be classified as follows: First, those in which the motive force consists of an electric motor set in motion from storage batteries; second, those in which power is derived from an engine supplied with steam generated with liquid fuel, and, third, those in which power is derived from an engine driven through the medium of explosions produced by automatically igniting or sparking an admixture of hydrocarbon and compressed air.

In the first class of machines the battery force necessary to operate the motor is not only expensive, but involves great weight and can only be used where a power plant is available for the restorage of the batteries.

In the second class the necessity arises for carrying a water tank or reservoir and also a gasolene or other hydrocarbon tank or reservoir, both of which, and especially the water-tank, must be of considerable proportions to adapt the machine to any extended travel. Another disadvantage in this class of machines lies in the fact that it necessarily requires an expert operator to run the same to secure a proper degree of safety for the machine and passengers, as it is a recognized fact that the use of steam-generators is always accompanied with risks of explosion, especially when not under the management of a skilled engineer, and in addition thereto there must also be provided a steam-boiler and furnace and pumps, and likewise a compressed-air tank to inject the hydrocarbon into the furnace. All of this necessary equipment involves great weight and complication of mechanism, and the constant heat necessary for the generation of steam is a source of great discomfort in warm weather to the occupants of the vehicle.

In the third class the necessity exists as a matter of course for a tank supplied with hydrocarbon and an engine with a fly-wheel. In this general construction the engine is utilized for the manufacture of the compressed-air. The fly-wheel in such a portable construction is a necessity, because it is utilized to store up the force necessary to first restore the piston to its initial position and exhaust the gases resulting from explosion; second, to carry the piston forward again to take in a supply of air, and, third, to again return it and compress the air previously taken in before the latter and a supply of hydrocarbon is ignited for a second explosion, and so on. It will thus be seen that the power created by the explosion is not only dissipated to a large extent in storing power in the fly-wheel, but said fly-wheel must be of a size and weight to accomplish its purposes as above described, and hence adds largely to the total weight and area of the mechanism, and obviously in such construction there is no means for starting the engine from a state of rest, because the movement of the engine is necessary to establish conditions which will conduce to its continued movement, and hence to start the engine it must be manipulated by hand until such movement brings about automatic operative conditions, and such class of engines (unlike a steam-engine) are not reversible, and therefore it requires additional mechanism for reversing the movement of the vehicle. The fact that the engine cannot be started from a state of rest except as stated renders it necessary whenever short stops are made to continue the movement of the engine and disconnect it from the other driving mechanism of the automobile, and this continued movement of the engine under such conditions is highly wasteful of the hydrocarbon, because the engine is not only running to no purpose, but, being relieved of work, of necessity runs at a greater speed and commensurate waste of material. This waste of material also takes place when the machine is traveling downgrade, and as the engine while running moves at a uniform minimum rate of speed when doing work it follows that it cannot be utilized to slow down the travel of the automobile and that such latter effect can be secured only through the use of brakes, thus subjecting the automobile vehicle to unnecessary strain and wear. As the engine of necessity starts and continues its movements (when working) at a uniform rate of speed, it necessarily follows that when the automobile is started from a state of rest such start is made with a jerk or suddenly and subjects the vehicle to strain and the occupants to discomfort.

My invention, while relating to improvements generally in automobiles, is more particularly allied to that class of machines which I have designated as the "third" class; and it has for object to utilize the advantages and avoid the disadvantages of the second class, to which I have referred, and also at the same time to avoid all of the recited disadvantages of the third class.

With these ends in view my invention consists in providing an automobile vehicle with, first, an engine; second, with mechanism operated explosively for producing compressed air and gaseous products; third, means for applying explosively the gaseous products of explosion to the engine, and, fourth, mechanism for utilizing the power exerted by the engine to operate the automobile, as will be hereinafter more fully explained.

My invention also consists in providing an automobile with, first, an engine; second, mechanism operated explosively to produce compressed air and gaseous products of explosion; third, means for applying expansively the gaseous products of explosion to the engine; fourth, a compressed-air tank or reservoir communicating with the mechanism operated explosively and also with the engine; fifth, means intermediate of the mechanism operated explosively and the compressed-air reservoir and means intermediate of the engine and air-reservoir for controlling the supply of compressed air to the explosively-operated mechanism and the engine, and, sixth, mechanism for transmitting the power of the engine to the automobile to operate the same, as will be hereinafter more fully explained.

My invention further consists in the details of construction which are employed in adapting the generic features of my invention to use, as will be hereinafter more fully explained.

In order that those skilled in the art to which my invention appertains may know how to make and operate my improved automobile and to fully understand its many advantages, I will proceed to describe its construction and operation, referring by characters to the accompanying drawings, in which—

Figure 1 is a side elevation of an automobile embodying the features of my invention. Fig. 2 is a longitudinal vertical section, on an enlarged scale, through the body of the vehicle and showing the operating mechanism in elevation and running-gear frame removed. Fig. 3 is a plan view, on same scale as Fig. 2, with the body, except a small portion, shown in section, and the running-gear removed. Fig. 4 is a side view, on an enlarged scale, of the front spring and its confining or supporting frame and the connection of the latter with the frame of the vehicle; and Fig. 5 is a vertical central section, on a larger scale than Fig. 2, of one of the side springs and its supporting-frame and showing in elevation or side view the connection of the latter to the frame of the vehicle.

Similar characters of reference indicate like parts in the several figures of the drawings.

A is the running-gear frame, of general rectangular shape and composed of tubing to secure necessary lightness of weight.

B B are the wheels, of ordinary bicycle or any preferred construction, one of the rear wheels being provided with a sprocket-wheel adapted to be operated by a chain C, leading to the engine.

D is the body, mounted upon the frame A by braces E, (see particularly Fig. 5,) bolted to the under side of the body D and having its ends bent downwardly and outwardly and formed with an annular collar F and threaded at the extremity to receive a nut G.

H is a ring, convex in cross-section, divided horizontally and joined by lugs $a$ and bolts $b$, and with the lower section formed with a pedestal $c$, adapted to be bolted or otherwise secured upon a suitable base or platform $d$ on the running-gear frame A.

I I are two plates formed with exterior ring-flanges and a central hollow hub, as clearly shown at Fig. 5, and J is a pneumatic spring composed of a hollow rubber ring of circular or elliptical form. The spring J is confined between the outer ring H and the ring-flanges of the plates I I, and the latter are rigidly held together between the collar F of the brace E and the nut G, and this construction establishes the connection between the body and the running-gear frame in an obvious manner. The forward end of the body A is supported upon and secured centrally to the running-gear frame A through the medium of a spring J, ring H, and plates I I, similar to those just described, and a brace K, (see Fig. 1,) secured to the plates in substantially the same manner as described with reference to the rear springs, and the outer ring-support of the forward spring is constructed and mounted in a similar manner.

L is the dash-frame, which is composed, preferably, of a single piece of tubing, which trends outwardly in a graceful curve and is coiled centrally to constitute a receptacle and support M for a suitable lamp.

An ordinary steering-lever N is provided for steering the front wheels, and O is a foot-brake, which is adapted through the medium of a bell-crank lever P and rod Q to apply a brake in the ordinary manner.

R R are braces leading from the vertical to the horizontal portions of the running-gear frame, and they are secured to the latter at the forward end by a sleeve connection S, so that as any one of the wheels B mounts any projection in the road the main frame A will not necessarily be raised. Consequently the engine, &c., mounted upon the reservoir-frame will not be subjected to vibration, nor is the secondary frame subjected to torsional strain.

T is a secondary hollow tubular frame, which constitutes a compressed-air tank or reservoir, and it is mounted upon and secured to the running-gear frame by supports U, which are connected to said frame by clip connections V or in any other suitable manner.

W is an engine of a type such as shown and described in Letters Patent No. 648,329, granted to me April 24, 1900, or No. 648,719, granted to me May 1, 1900, or of any other suitable construction.

X is an air-compressing machine, such as shown and described in an application for Letters Patent filed in the United States Patent Office by me on the 26th day of June, 1900, Serial No. 21,669, and in which primary and secondary air-compressing pistons are moved through the medium of an initial piston driven by explosive force and connected with the other pistons by toggle-levers, or, when air in liquefied form is used to furnish the necessary oxygen to the explosion-chamber of the air-compressing machine, such compressing-machine may be of that character illustrated and described in another application, filed by me on the 5th day of June, 1900, Serial No. 19,188.

The final compression-cylinder of the air-compressing machine is connected with the hollow frame or air-reservoir T by means of a pipe Y and with the explosion-chamber of the compressor by branch Z. (See Fig. 2.) This pipe or conduit communicates also with the engine W by a pipe 1, provided with an automatic check-valve 2, the action of which will be hereinafter explained.

3 is a hydrocarbon-reservoir provided with a pipe 4, leading to the explosion-chamber of the compressor, which chamber is charged with the hydrocarbon and compressed or liquid air by automatic chargers, such as described in the application Serial No. 19,188, hereinbefore referred to, or in any other suitable manner.

5 is a gas tank or chest which receives the gases generated by the successive explosions of the oxygen and hydrocarbon in the explosion-chamber of the compressor, and 6 is a pipe leading from the gas-chest 5 to the engine.

7 is a valve in the gas-chest to control the flow of gas into the conduit 6, and this valve is automatically operated through the medium of a tappet 8. An exhaust-pipe 9 from the engine terminates in a suitable muffle-box, if desired.

10 is the throttle-lever of the engine, and 11 is a reversing-lever.

The engine and air-compressor are secured to a platform 12, (see Fig. 2,) mounted on the reservoir-frame T, or in any other suitable manner.

I have not described in detail the construction and operation of either the engine or the compressor, as they form no part of my present invention and for the reason that any engine adapted to be operated expansively by the gases resulting from the explosion of hydrocarbon and oxygen, alone or in conjunction with and aided by a supply of compressed air, will be equally adapted for use in connection with my improved automobile and because any air compressing or liquefying machine capable of use in the manner described may be employed, my invention in respect of the means for driving the automobile resting in the generic idea of combining with the vehicle proper an engine of the type described and a mechanism for making compressed or liquefied air and providing a reservoir for receiving the excess of air over and above the amount utilized while the vehicle is in motion.

It will be understood from the construction and arrangement described that when compressed or liquid air and hydrocarbon in predetermined quantities are forced into the explosion-chamber of the air-compressor and automatically sparked or ignited through the medium, for instance, of a sparking-battery and a conductor (illustrated at 13) the force exerted by the explosion drives the pistons of the compressor and forces the compressed air through the pipe Y, a portion of such compressed air is delivered through the connection Z to the explosion-chamber, and all in excess of the amount required for an explosive charge passes beyond the connection Z and is delivered into the hollow frame or reservoir T until the same is completely loaded, and that thereupon and during the continuing operation of the mechanism for compressing the air and the running of the engine to drive the vehicle, when the pressure in the reservoir exceeds the resistance offered by the check-valve 2, the latter will open and allow a given quantum of compressed air to travel directly to the engine to coöperate with the other motive force exerted by the expansive action of the gases resulting from the explosions taking place in the explosion-chamber of the air-compressor. After the explosions have by impact driven the initial piston of the compressor the residual gases of such explosions are on the return of the piston exhausted into the gas-chest 5 and through the medium of the valve 7 and conduit-pipe 6 delivered to the engine and operated expansively to operate the piston of the same. It will therefore be understood that so long as the vehicle is in motion it is not only supplying the necessary amount of compressed air to run the machine and mechanism for driving the same, but that it is also storing up in the reservoir T a supply to be drawn upon when it is desired to start the machine from a state of rest, which may be accomplished by relieving the check-valve 2 and utilizing a portion of the compressed air in the reservoir T to start the engine, the continued movement of which sets in operation all the other mechanism connected with the vehicle and establishes the conditions for keeping the vehicle in motion. From this explanation it will be seen that when the machine is brought to a state of rest the engine and other operative mechanism are also brought to a state of rest, and therefore great economy in the motive agents is effected, which is of particular advantage with respect of the hydrocarbon. It will also be seen that a large saving is effected by shutting down the engine when the vehicle is traveling downgrade or under the effect of momentum.

In all machines where the force necessary to run the same is generated in the machine it is obvious that delay ensues, because the power to run the motor has to be first created before it can be utilized in driving the vehicle. With my improved machine, as will be readily understood, during the use of the machine the excess of compressed air over and above the amount necessary to run the compressor is stored in the compressed-air reservoir or frame and is ever present to be utilized in starting the engine and other mechanism, and consequently the vehicle may be started on the instant desired.

It will of course be understood that when my improved machine is first put in use the reservoir T must be filled or loaded from an ordinary hand-pump, such as is employed to inflate tires, and in the event that the vehicle should be out of service for such length of time that the compressed-air supply becomes deteriorated to such an extent as to be unavailable for the purpose of starting the engine the reservoir may be replenished in the manner described; but under all ordinary circumstances my improved vehicle is ready for instant use and may be promptly started and immediately begins the creation of the most important constituent of the motive force and in addition stores up a supply for future use.

The carrying capacity of my vehicle is necessarily largely increased over such vehicles as are provided with compressed-air tanks, because such tanks being designed to carry the full complement of air necessary for a given distance of travel must of necessity be bulky and heavy, and in cases when the air is compressed by the action of the engine as it is required for consumption in the explosive-chamber to drive the engine a large percentage of the energy created by the engine is necessarily dissipated in the requirement for compressing the air. This condition also involves the employment of a fly-wheel on the engine, which not only requires considerable space, but adds largely to the aggregate weight of the machine.

While I have shown and obviously prefer to use the storage-reservoir T for husbanding the excess of air compressed by the compressor, it will be understood that I may use the compressor without such reservoir and either reduce the capacity of the compressor to that necessary for producing the amount of air required for the successive explosions or a suitable valve may be employed to permit escape of any excess.

I desire to call particular attention to the fact that as the engine which drives the vehicle through the medium of its connection with the driving-wheels is absolutely controlled by the throttle-valve in the conduit leading from the explosion-chamber of the air-compressor the action of the engine is at all times under perfect control and that the vehicle may not only be started and stopped at will, but that the speed thereof may be varied at pleasure, and as a sequence of the construction described the action of the compressor is likewise under perfect control.

Recurring to the spring connection between the body of the vehicle and the running-gear frame, I desire to call attention to the fact that while the spring construction forms the subject-matter of another application hereinbefore referred to it is peculiarly well adapted for use in an automobile vehicle, as it avoids all undue vibration, while at the same time it effectually takes up or dissipates all momentum shocks, and by reason of the peculiar construction and connections shown the vehicle is not only supported vertically upon springs, but the latter also act yieldingly to and prevent too much lateral and longitudinal movement of the vehicle-body—in short, they constitute universal spring connections between the body and the running-gear.

While I have shown the springs of elliptical form and prefer such as giving the best vertical support, it will be understood that, if so desired, they may be made of any other suitable design. The rings J may be permanently inflated in the manner described in Letters Patent No. 642,775, granted to me on the 6th day of February, 1900, or they may be provided with any preferred form of valve and inflated in the same manner as ordinary bicycle or vehicle tires.

While I have shown and prefer that the ring-springs J should be hollow and inflated, as described, it will be understood that they may be made solid and of sufficient flexibility to accomplish the purposes designed.

Having described the construction and operation of my improved automobile vehicle, what I claim as new, and desire to secure by Letters Patent, is—

1. In an automobile vehicle the combination with the body mounted upon suitable driving and steering wheels, an engine secured in position and suitably connected with the driving-wheels, and a hydrocarbon-reservoir, an air-compressor operated directly by the explosions of explosive agents, a conduit between the compressed-air cylinder and the explosion-chamber of the air-compressor, valve-controlled connections between the explosion-chamber and the engine, and suitable means for transmitting motion from the engine to the driving-wheels of the vehicle, substantially as hereinbefore set forth.

2. In an automobile vehicle the combination with the body mounted upon suitable driving and steering wheels, an engine secured in position and suitably connected with the driving-wheels, and a hydrocarbon-reservoir, an air-compressor operated by the explosions of explosive agents, a conduit between the compressed-air cylinder and the explosion-chamber, valve-controlled connections between the explosion-chamber and the engine, a storage-reservoir communicating with the compressed-air cylinder and explosion-chamber of the air-compressor, and a valve-controlled connection between the air-reservoir and the engine, substantially as and for the purposes set forth.

3. In combination with the running-gear frame, mounted upon suitable driving and steering wheels, an auxiliary hollow frame mounted and supported upon the running-gear frame and adapted to contain compressed air and connected with and adapted to support the driving mechanism substantially as hereinbefore set forth.

4. In combination with the body, and the running-gear frame supported upon driving and steering wheels, intermediate tubular ring-springs arranged in bearings connected by suitable means with the body and the running-gear, substantially as and for the purposes set forth.

5. In combination with the body and the running-gear frame, the ring-springs, confined within a ring-bearing secured to the running-gear frame, confining-plates provided with ring-flanges, and braces secured to the body, and at their lower extremities centrally to the plates, substantially as and for the purpose set forth.

6. In a vehicle, in combination with the body and the running-gear frame, rubber ring-springs confined within ring-shaped bearings and connected with the body and frame, substantially as and for the purposes set forth.

7. In an automobile vehicle such as described and composed of a suitable body mounted upon a running-gear frame provided with driving and steering wheels, a secondary reservoir-frame, adapted to support an engine and connected with the running-gear frame by vertical braces, the forward or rear ones of which are vibratively connected with the running-gear frame, substantially as and for the purposes set forth.

In testimony whereof I affix my signature in presence of two witnesses.

JAMES C. ANDERSON.

Witnesses:
GEO. E. FRECH,
HESTER R. BUNCH.